(12) United States Patent
Duda et al.

(10) Patent No.: US 9,306,804 B2
(45) Date of Patent: Apr. 5, 2016

(54) METHOD AND SYSTEM FOR MULTICHASSIS LINK AGGREGATION IN-SERVICE SOFTWARE UPDATE

(71) Applicants: Kenneth J. Duda, Santa Clara, CA (US); Roger S. Liao, Santa Clara, CA (US); Nathan D. Arroyo, Santa Clara, CA (US)

(72) Inventors: Kenneth J. Duda, Santa Clara, CA (US); Roger S. Liao, Santa Clara, CA (US); Nathan D. Arroyo, Santa Clara, CA (US)

(73) Assignee: Arista Networks, Inc., Santa Clara, CA (US)

( * ) Notice: Subject to any disclaimer, the term of this patent is extended or adjusted under 35 U.S.C. 154(b) by 298 days.

(21) Appl. No.: 13/863,504

(22) Filed: Apr. 16, 2013

(65) Prior Publication Data

US 2014/0307540 A1     Oct. 16, 2014

(51) Int. Cl.
H04L 12/24     (2006.01)

(52) U.S. Cl.
CPC .......... *H04L 41/082* (2013.01); *H04L 41/0866* (2013.01)

(58) Field of Classification Search
CPC .......... H04L 12/56; H04L 12/24; H04L 12/26; H04L 12/28; H04L 41/082; H04L 41/06
See application file for complete search history.

(56) References Cited

U.S. PATENT DOCUMENTS

| | | | |
|---|---|---|---|
| 7,839,843 B2 | 11/2010 | Dontu et al. | |
| 8,730,963 B1* | 5/2014 | Grosser et al. | 370/392 |
| 2007/0230366 A1* | 10/2007 | Takatori | 370/254 |
| 2008/0137660 A1 | 6/2008 | Olakangil et al. | |
| 2010/0211658 A1* | 8/2010 | Hoogerwerf et al. | 709/221 |
| 2011/0228767 A1 | 9/2011 | Singla et al. | |
| 2011/0280572 A1 | 11/2011 | Vobbilisetty et al. | |
| 2011/0299528 A1 | 12/2011 | Yu et al. | |
| 2013/0003733 A1 | 1/2013 | Venkatesan et al. | |
| 2013/0201986 A1 | 8/2013 | Sajassi et al. | |
| 2014/0036924 A1 | 2/2014 | Christenson | |
| 2014/0140220 A1* | 5/2014 | Janardhanan et al. | 370/244 |
| 2014/0362854 A1 | 12/2014 | Addanki et al. | |
| 2015/0016462 A1 | 1/2015 | Zhou | |
| 2015/0085862 A1 | 3/2015 | Song | |
| 2015/0188753 A1 | 7/2015 | Anumala et al. | |

* cited by examiner

*Primary Examiner* — Anez Ebrahim
(74) *Attorney, Agent, or Firm* — Osha Liang LLP

(57) ABSTRACT

A method for performing an in-service software update in a MLAG domain. The method includes restarting the first switch using a second version of software, detecting by a second switch that the first switch is restarting and, in response to the detection, SSO. After restarting the first switch, prior to the first switch performing graceful reinsertion into the MLAG domain, setting all non-peer ports on the first switch to an error-disabled state and selecting a common MLAG protocol version supported by the first switch and the second switch and performing graceful reinsertion, which includes reestablishing a peering relationship between the first switch and the second switch using the common MLAG protocol, and after reestablishing the peering relationship, synchronizing a control plane state of the first switch with the control plane state of the second switch and setting all non-peer ports on the first switch to an active state.

16 Claims, 12 Drawing Sheets

METHOD AND SYSTEM FOR MULTICHASSIS LINK AGGREGATION IN-SERVICE SOFTWARE UPDATE

BACKGROUND

Over the lifecycle of a switch, it is common practice to need to update the software executing on the switch. Updating the software executing on the switch typically requires that the switch be taken offline and then restarted with the updated software. During the time the switch is taken offline through the time in which the switch has resumed operation, a potentially large number of packets are dropped—resulting in decreased performance of the network infrastructure.

SUMMARY

In general, in one aspect, the invention relates to a method for performing an in-service software update (ISSU) in a multichassis link aggregation (MLAG) domain, the method comprising restarting the first switch using a second version of software, wherein the first switch is currently executing a first version of the software and the first version of the software is different from the second version of the software, detecting by a second switch that the first switch is restarting and, in response to the detection, performs a stateful switchover (SSO), wherein the MLAG domain consists of the first switch and the second switch, after restarting the first switch: prior to the first switch performing graceful reinsertion into the MLAG domain, setting all non-peer ports on the first switch to an error-disabled state and selecting a common MLAG protocol version supported by the first switch and the second switch, and performing graceful reinsertion comprising: reestablishing a peering relationship between the first switch and the second switch using the common MLAG protocol, and after reestablishing the peering relationship between the first switch and the second switch, synchronizing a control plane state of the first switch with the control plane state of the second switch and setting all non-peer ports on the first switch to an active state.

Other aspects of the invention will be apparent from the following description and the appended claims.

DETAILED DESCRIPTION

Specific embodiments of the invention will now be described in detail with reference to the accompanying figures. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-6G, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

In general, embodiments of the invention relate to performing an in-service software update (ISSU) on a switch. More specifically, embodiments of the invention relate to performing an ISSU on a switch, where the switch is a multichassis link aggregation (MLAG) peer in an MLAG domain.

In one or more embodiments of the invention, MLAG is a switch behavior where two switches cooperate to provide the illusion of a single switch from the point of view of any externally connected device. The two switches are called MLAG peers, their union is called the MLAG domain, and the link or links directly connecting them are called the peer link or links. In one embodiment, the switches cooperate to provide the illusion of a single layer-2 Ethernet switch such that external devices may connect using link aggregation groups (LAGs) made up of a set of links where one subset of the links terminates on the first switch, and the remaining links terminate on the second switch. One skilled in the art will recognize that maintaining this illusion requires several distinct types of coordination, including Spanning Tree Protocol (STP) coordination, Link Aggregation Control Protocol (LACP) coordination, MAC Address Learning coordination, and IGMP Snooping coordination.

Figure 1:
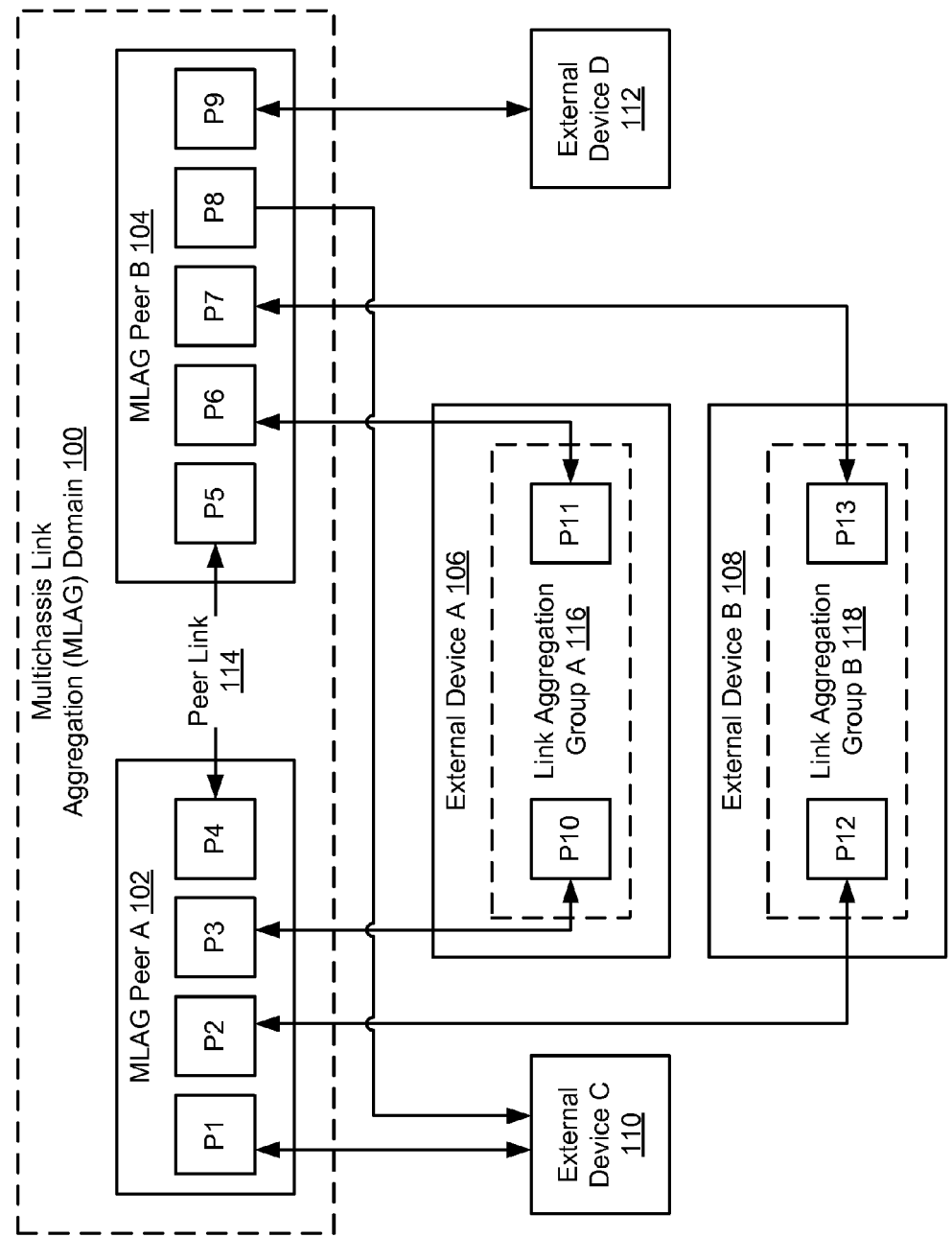
FIG. 1 shows a system in accordance with one or more embodiments of the invention.

FIG. 1 shows a system in accordance with one or more embodiments of the invention. The system includes an MLAG domain (100) and a number of external devices (106, 108, 110, 112). Each of these components is described below.

In one embodiment of the invention, the MLAG domain (100) includes a pair of MLAG peers (102, 104), where each of the MLAG peers (102, 104) is a switch. In one embodiment of the invention, a switch is a physical device that includes persistent storage, memory (e.g., Random Access Memory), one or more processors, and two or more physical ports (e.g., P1-P9). Each port may be connected to either: (i) an MLAG peer or (ii) an external device (106, 108, 110, 112). Ports connected to an MLAG peer may be referred to as peer ports while ports not connected to the MLAG peer may be referred to as non-peer ports.

With respect to the peer ports, each MLAG peer may include one or more peer ports, where the peer ports on one MLAG peer are connected (e.g., via a wired connection) to the peer ports on the other MLAG peer. The result is one or more physical links between the MLAG peers. These links may be collectively referred to as a peer link (114). The peer link (114) may be established and/or active when at least one physical link that is part of the peer link is active. The physical link is considered to be active when peer ports on each side of the physical link are active.

Continuing with the discussion of a switch, each switch is configured to receive packets via the non-peer ports and determine whether to (i) drop the packet, (ii) process the packet as part of a layer-2 control protocol (e.g., Spanning Tree Protocol (STP), Link Aggregation Control Protocol (LACP), Internet Group Management Protocol (IGMP)); or (iii) send the packet out over another one of the ports on the switch. How the switch makes the determination of whether to drop or send the packet depends on whether the switch is a layer-2 (L2) switch or a layer-3 (L3) switch (also referred to as multilayer switch). If the switch is operating as a L2 switch, the switch uses the destination media access control (MAC) address in the received packet along with a forwarding table to determine out of which port to send the packet. If the switch is operating as a L3 switch, the switch uses the destination internet protocol (IP) address in the received packet along with a routing table to determine out of which port to send the packet. In one embodiment of the invention, the persistent storage in the switch may include any non-transitory computer readable medium that includes instructions, which when executed by the one or more processors in the switch, enable the switch to perform the functions described in this application (see e.g., FIGS. 2-5).

In one embodiment of the invention, an external device may be (i) a switch, (ii) a router, (iii) a computer system, or (iv) any other device that is able to connect to at least one port in the MLAG domain. The computer system (with a processor, memory, and persistent storage) may correspond to any type of system that is configured to send and receive packets.

In one embodiment of the invention, each external device may be a singly-connected device or a dually-connected device. A singly-connected device is only connected to a single port on one of the MLAG peers (see e.g., 112). A dually-connected device is connected to at least one port on each of the MLAG peers in the MLAG domain (e.g., 106, 108, 110). If an external device is dually-connected, then the ports on the external device that are connected to the MLAG domain in order to make the external device a dually-connected device are collectively referred to as a link aggregation group (e.g., 116, 118).

In one embodiment of the invention, to external devices that are dually-connected devices, the MLAG domain appears as a single switch. For example, from the perspective of external device A (106) and external device B (108), the MLAG domain appears as a single switch with a media access control (MAC) address (which is different than the MAC addresses of the MLAG peer A (102) and MLAG peer B (104)) and ports P1-P9. Further, based on the above, external device A (106) operates as if port P10 and P11 are connected to the same switch. Similarly, external device B (108) operates as if port P12 and P13 are connected to the same switch.

In order to behave (or at least appear to external devices that are dually-connected) as a single switch, the MLAG domain (100) implements the following functionality: (i) one MLAG peer is designated as a primary switch and one MLAG peer is designated as a secondary switch; (ii) the primary switch is responsible for implementing spanning tree protocol (STP) for the MLAG domain, which includes generating all configuration bridging protocol data unit messages (also referred to as STP configuration messages), issuing the STP configuration messages over one or more ports in the MLAG domain and processing the received STP configuration messages in accordance with STP; (iii) the secondary switch implements its own instance of STP using the STP configuration messages received by the MLAG domain but the results of processing the STP configuration messages are not used while the primary switch is active (see FIG. 3 below); (iv) the MLAG peers share forwarding table information via the peer link such that the MLAG peers have synchronized forwarding tables; (v) the individual MLAG peers each implement their own instance of various layer-2 control protocols such as LACP and IGMP. In one embodiment of the invention, while the individual MLAG peers implement their own instances of LCAP the MLAG peers both use the MAC address associated with the MLAG domain (instead of the MAC addresses that are associated with the individual MLAG peers).

In one embodiment of the invention, both MLAG peers are implemented as symmetric MLAG (i.e., there is no designation of primary and secondary switches in the MLAG domain). In such embodiments, the MLAG peers both implement symmetric coordinated instances of STP for all non-peer ports on the MLAG peer. Further, each of the MLAG peers implement their own instances of the various layer-2 protocols (as discussed above)

With respect to the forwarding tables, when a packet is received on a port in the MLAG domain and there is no entry in the forwarding table on the MLAG peer that received the packet, the MLAG peer that received the packet is responsible for generating the forwarding table entry. Specifically, the MLAG peer (i) determines whether the packet was received from a port that is part of a link aggregation group (e.g., 116, 118); (ii) if the packet was received from a port that is associated with the link aggregation group, the packet is forwarded out all ports (including via one peer port if there are any singly-connected external devices on the other MLAG peer) on the MLAG peer except the ports on the MLAG peer associated with the link aggregation group; and (iii) once the information for the forwarding table entry is obtained (e.g., which port in the MLAG peer is associated with the destination MAC address in the packet), the MLAG peer stores this information in its forwarding table and provides the information to the other MLAG peer in the MLAG domain. The other MLAG peer may use this information along with link aggregation group information (if present) to generate a forwarding table entry.

If in (i) the packet was not received from a port that is part of a link aggregation group, then the MLAG peer proceeds to generate a forwarding table entry in the same manner that a single switch would generate a forwarding table entry. Further, with respect to (ii), those skilled in the art will appreciate that packets are sent out to all ports subject to VLAN membership tests, STP topology tests, and/or one or more access control lists (ACLs).

The following describes an example of generating forwarding table entries for MLAG peers in the MLAG domain. Turning to the example, assume that a packet (with destination MAC A) is received from external device B (108) on P7 of MLAG peer B and that there is no forwarding table entry for MAC A. MLAG peer B sends the packet out over P6, P8, and P9. MLAG peer B subsequently determines that the packets with destination MAC A (corresponding to external device A) should be forwarded out P6. This information is stored in a forwarding table entry in MLAG peer B (104). This information is also forward to MLAG peer A (102). Upon receipt, MLAG peer A creates a forwarding entry that includes MAC A and P3. MLAG peer A is able to create this forwarding entry because MLAG peer A (102) includes information that indicates P3 and P6 are in a link aggregation group.

The invention is not limited to the system configuration shown in FIG. 1.

FIGS. 2-5 show flowcharts in accordance with one or more embodiments of the invention. While the various steps in the flowchart are presented and described sequentially, one of ordinary skill will appreciate that some or all of the steps may be executed in different orders, may be combined or omitted, and some or all of the steps may be executed in parallel. In one embodiment of the invention, the steps shown in FIGS. 2-5 may be performed in parallel with any other steps shown in FIGS. 2-5 without departing from the invention.

Figure 2:
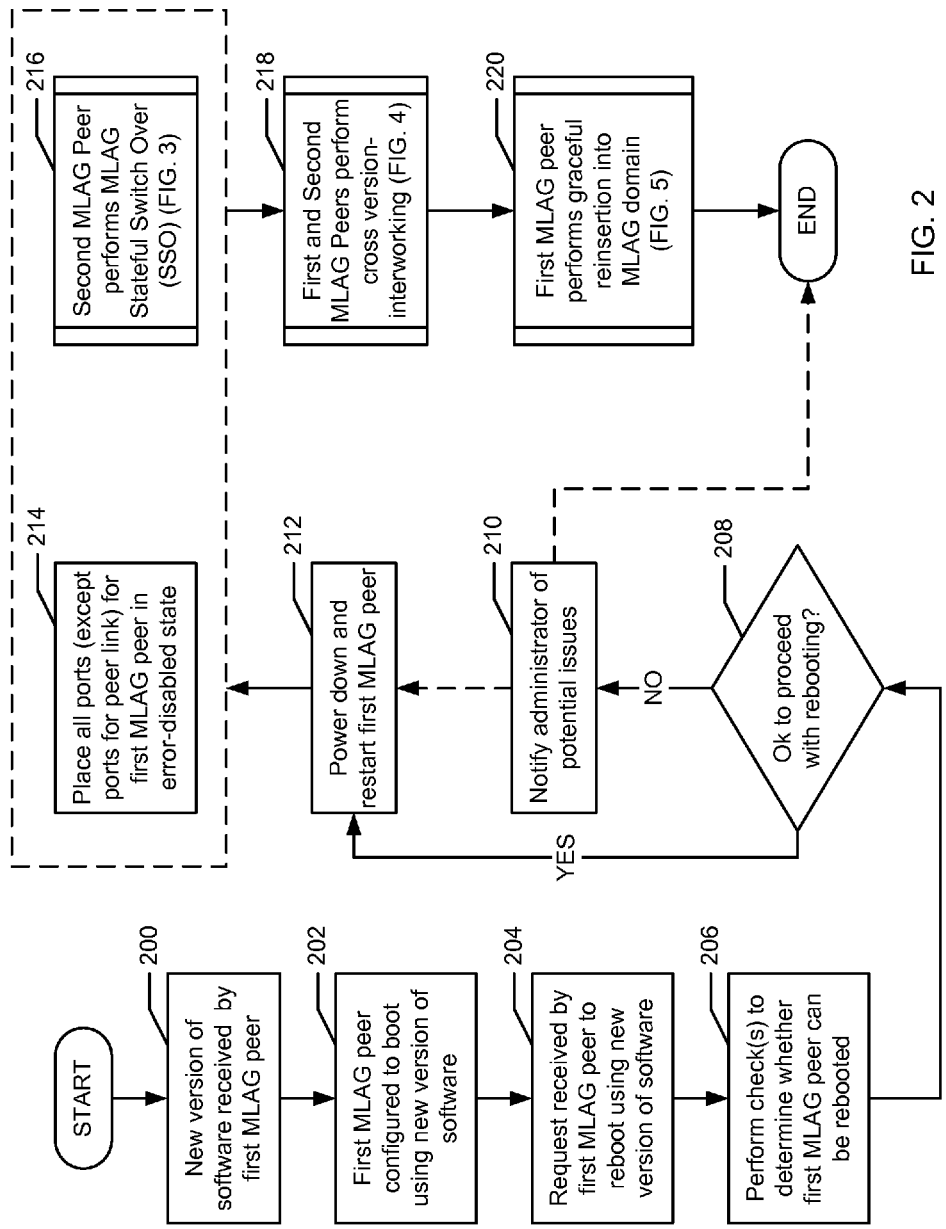
FIG. 2 shows a flowchart for performing an in-service software update on a switch in a multichassis link aggregation (MLAG) domain in accordance with one or more embodiments of the invention.

Turning to FIG. 2, FIG. 2 shows a flowchart for performing an in-service software update on a switch in a multichassis link aggregation (MLAG) domain in accordance with one or more embodiments of the invention.

In Step 200, a new version of software is received (or otherwise loaded onto) the first MLAG peer. In one embodiment of the invention, the new version of software corresponds to software that is not currently executing on the first MLAG peer. The new version of software may be an older version of software as compared with the current version of software executing on the first MLAG peer (i.e., the new version of software is related to a downgrade of the software on the first MLAG peer). Alternatively, the new version of software may be a new version of software as compared with the current version of software executing on the first MLAG peer (i.e., the new version of software is related to an upgrade of the software on the first MLAG peer). Prior to step 200, the two switches (denoted as first MLAG peer and second MLAG peer) are operating as part of a MLAG domain.

In Step 202, the first MLAG peer is configured to boot using the new version of the software. This may involve modifying one or more configuration files and/or settings in the first MLAG peer.

In Step 204, a request is received to reboot the first MLAG peer using the new version of the software. The request may be issued by an administrator, another user, or by an automated process.

In Step 206, one or more checks are performed to determine if the first MLAG peer can be rebooted. The checks may include, but are not limited to, one or more of the following: (i) confirming that the new software version supports at least one version of the MLAG protocol in common with the second MLAG peer (i.e., the MLAG peer that is not currently being updated); (ii) confirming that the spanning tree state determined by performing the STP (by the primary switch in the MLAG domain) is stable (e.g., the spanning tree state has not changed for at least a period of time (e.g., 30 seconds)).; (iii) confirming that every external device intended to be a dually-connected device is actively connected to both switches in the MLAG domain (i.e., the links between the external device and the MLAG peers are active); (iv) confirming that the duration of the reload delay timer is sufficient to enable a user (e.g., an administrator) to roll back the software upgrade (or downgrade) if MLAG peers (after one has been upgraded (or downgraded) with the new software) fail to reestablish the MLAG peering relationship (see FIG. 5, Step 502); and (v) confirming the second MLAG peer does not have its non-peer ports in an error-disable state and/or that the reload delay timer from any recent reboot of the second MLAG peer has expired.

In Step 208, a determination is made about whether the first MLAG peer may be rebooted based on one or more of the checks performed in Step 206. If one or more of the checks fails in Step 208, the process proceeds to Step 210; alternatively, the process proceeds to Step 212. The first MLAG peer may include functionality to proceed to step 212 even if one or more checks from step 206 fail in the event that the first MLAG peer includes heuristics/rules to make such a determination. The heuristics/rules may be provided by an administrator (or other user) at any point prior to step 208.

In Step 210, the administrator (or another user) is notified of potential issues that may result from the rebooting of the first MLAG peer with the new version of software. The administrator (or another user) may either stop the upgrading (or downgrading) of the first MLAG peer and end the process or allow the upgrading (or downgrading) of the first MLAG peer to continue. The administrator (or another user) may also take additional action with respect to correcting/attempting to correct one or more issues raised by the checks performed in step 206 prior to determining whether to proceed to step 212 or end the process.

In Step 212, the first MLAG peer is rebooted (which may or may not include powering down/turning-off the first MLAG peer) with the new version of the software. For purposes of this discussion, the flowcharts use the terms first MLAG peer and second MLAG peer; however, prior to successfully completing at least the steps 500-502 in FIG. 5, the switches (after step 212) are not part of an MLAG domain; rather, they act as individual switches. However, during this time, because the first MLAG peer maintains its non-peer link ports in an error-disabled state, the external devices that were connected to the MLAG domain (prior to the rebooting) continue to perceive that they are connected to a single switch where various ports on the single switch are disabled.

As shown in FIG. 2, steps 214 and 216 may be performed in parallel. Alternatively, steps 214 and 216 may be performed sequentially (in either order).

Continuing with the discussion of FIG. 2, in Step 214, once the first MLAG peer is restarted with the new version of the software, all ports (except the peer ports) are placed in (or otherwise set to) an error-disabled state. While in the error disabled-state, the non-peer ports do not receive packets from external devices or send packets to external devices.

Figure 3:
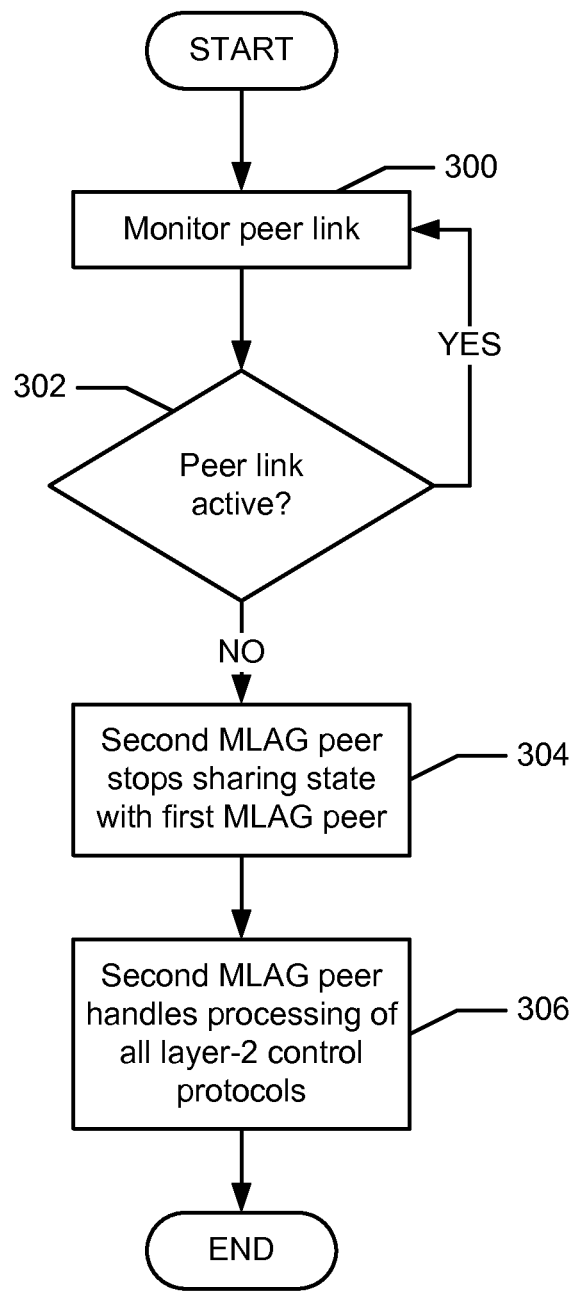
FIG. 3 shows a flowchart for performing stateful switchover software on a switch in an MLAG domain in accordance with one or more embodiments of the invention.

In Step 216, the second MLAG peer performs MLAG Stateful Switch-Over (SSO) (See FIG. 3). MLAG SSO may be triggered as soon as the second MLAG peer detects that the peer link is inactive (or otherwise disabled). The peer link is disabled when none of the physical links that make up the peer link are active. Accordingly, MLAG SSO may be started when the first MLAG peer is powered down in Step 212. MLAG SSO enables the external devices that were dually-connected to the MLAG domain (when the MLAG domain was active) to continue to operate as if the MLAG domain is active.

In Step 218, at some later point in time, following step 214, the first and second MLAG peers may perform cross-version interworking (See FIG. 4 for additional details related to step 214). The result of performing the cross-version interworking is to determine a common MLAG protocol version to use to reestablish the MLAG domain. In Step 220, once the common MLAG protocol version is determined in Step 218, the first MLAG peer performs graceful reinsertion resulting in the successful reestablishment of the MLAG domain. (See FIG. 5. for additional details related to step 220)

After Step 220, the process may be repeated for the second MLAG peer in the MLAG domain. In this manner, both switches in the MLAG domain may be upgraded (or downgraded) without impacting (or minimally impacting) the operation of the network. When the second MLAG peer is to be updated (or downgraded), Steps 200-202 may be performed on the second MLAG peer while one or more steps in FIG. 2 are being performed to upgrade (or downgrade) the first MLAG peer.

Referring to FIG. 3, FIG. 3 shows a flowchart for performing stateful switch-over software (SSO) on a switch in an MLAG domain in accordance with one or more embodiments of the invention.

In Step 300, the peer link is monitored to determine whether the peer link is active. The monitoring may be performed using any known method of monitoring whether a link is active.

In Step 302, a determination is made about whether the peer link is active (i.e., packets may be communicated between the first and second MLAG peers via the peer link). If the peer link is active, the process proceeds step 300; otherwise, the process proceeds to Step 304. Steps 300-302 may be performed independently by each of the MLAG peers once the MLAG domain has been formed.

In Step 304, if the peer link is not active, the second MLAG peer stops sharing or attempting to share state information with the first MLAG peer. The state information may include, but is not limited to, forwarding table entries, virtual local area network (VLAN) configuration, information related to the spanning tree state, and any other information required by the first MLAG peer in order for the first MLAG peer to operate as part of the MLAG domain.

In Step 306, the second MLAG peer handles processing of all layer-2 control protocols (e.g., STP, RSTP, MSTP, PVSTP, RPVSTP, LACP, IGMP Snooping, and/or IGMP Querier). If the second MLAG peer was the primary switch, then the processing of layer-2 control protocols does not change after the peer link is no longer active. However, if the second MLAG peer was the secondary switch, then the second MLAG peer begins handling all the processing of all layer-2 control protocols that it was not previously handling. For example, in this scenario, the second MLAG peer, using the last spanning tree state received from the first MLAG peer, starts to perform the STP. However, as discussed above, the second MLAG peer start performing the STP using the last spanning tree state provided by the first MLAG peer instead of performing the STP when a switch first connects to the network. In this manner, the impact of transitioning the processing of the STP from the first MLAG peer to the second MLAG peer has minimal or no impact on the performance of the second MLAG peer.

Figure 4:
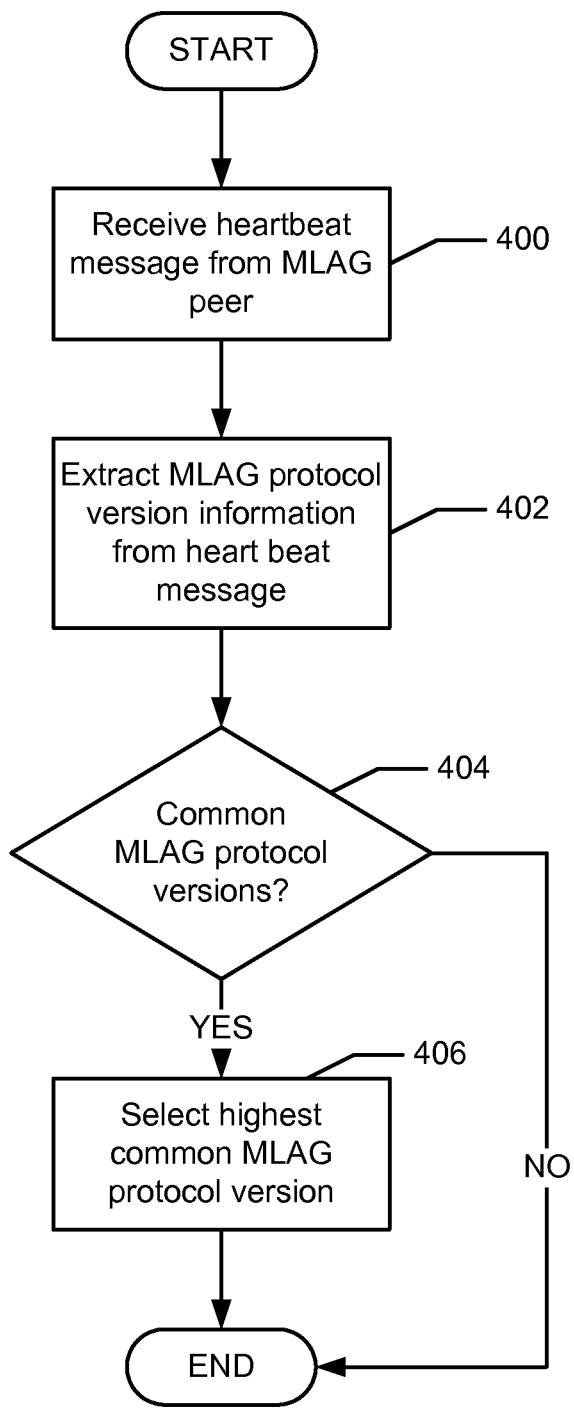
FIG. 4 shows a flowchart for performing cross-version interworking in accordance with one or more embodiments of the invention.

Referring to FIG. 4, FIG. 4 shows a flowchart for performing cross-version interworking in accordance with one or more embodiments of the invention. The steps shown in FIG. 4 are performed independently and concurrently (though not necessarily simultaneously) by each of the MLAG peers.

In Step 400, an MLAG peer receives a heartbeat message from the other MLAG peer. As discussed above, in this context, because there is no MLAG domain, the switches that are performing the steps in FIG. 4 are not MLAG peers but rather switches that are attempting to reestablish an MLAG domain. However, for consistency with terminology used in FIG. 2, the switches are referred to as MLAG peers.

In one embodiment of the invention, the heartbeat messages may include, but are not limited to,: (i) versionMax: the maximum (latest) version of the MLAG protocol supported in the software running on MLAG peer that issued the heartbeat message; (ii) versionMin: the minimum (earliest) version of the MLAG protocol supported in the software running on MLAG peer that issued the heartbeat message; (iii) localLastReceiveTime: the local time when the MLAG peer that issued the heartbeat message last received a heartbeat message from the other MLAG peer; (iv) peerSendTimeInLastReceivedHeartbeat: the value of localSendTime in the last heartbeat message received from the other MLAG peer; and (v) localSendTime: the local time at which this heartbeat is sent by the MLAG peer that issued the heartbeat message. Items (i)-(ii) may be sent in the heartbeat message as a range of MLAG protocol versions supported by the MLAG peer. Items (iii)-(v), collectively referred to as clock data, may be used by the MLAG peers to individually estimate the clock offset between their local clocks and to determine the latency (one-way delay) between the MLAG peers each time a heartbeat is received. The heartbeat message may include less information that is included above without departing from the invention. Further, the aforementioned information (or portions thereof) may be transmitted via the peer link using any type of packet and/or protocol without departing from the invention.

In Step 402, the MLAG protocol version information (e.g., items (i) and (ii) above) is obtained from the heartbeat message.

In Step 404, a determination is made about whether there are any common MLAG protocol versions supported by the MLAG peers. If there are no common MLAG protocol versions supported by the MLAG peers, the process ends; otherwise, the process proceeds to Step 406. In Step 406, the highest common MLAG protocol version supported by the MLAG peers is selected as the common MLAG protocol version.

Figure 5:
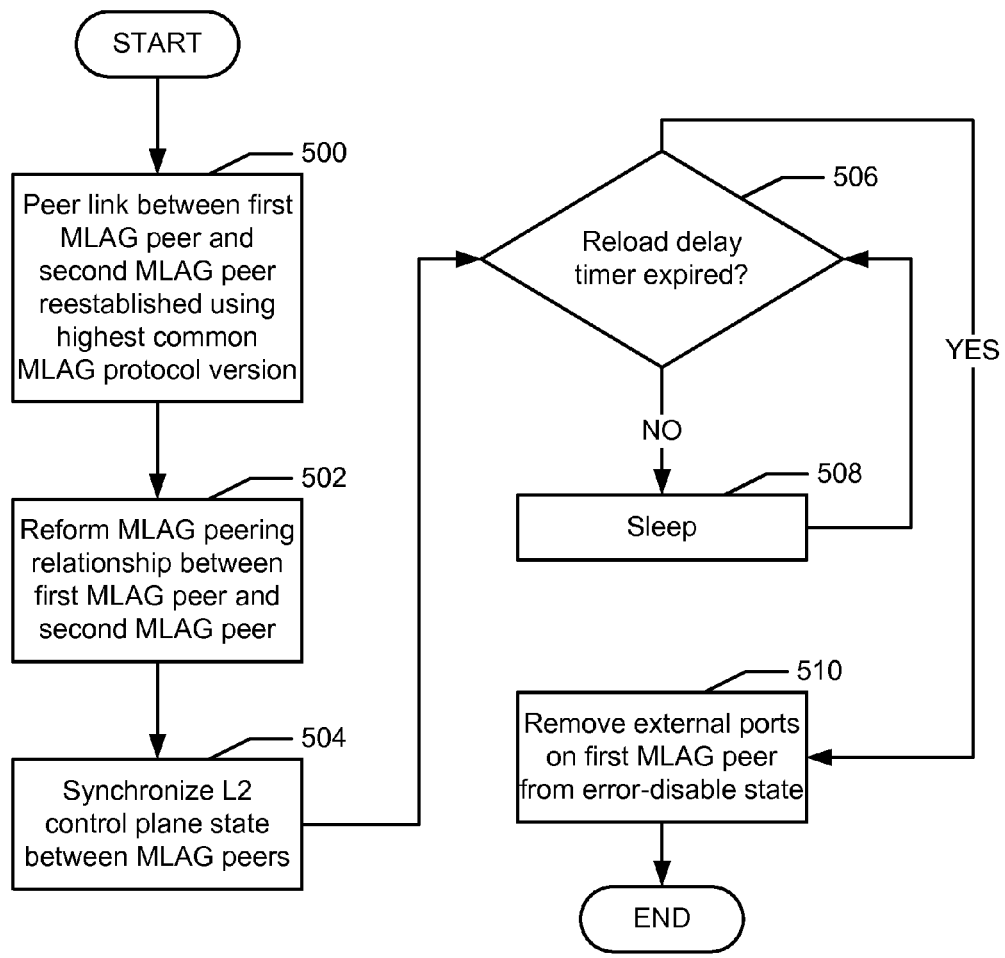
FIG. 5 shows a flowchart for performing graceful reinsertion of a switch into an MLAG domain in accordance with one or more embodiments of the invention.

Referring to FIG. 5, FIG. 5 shows a flowchart for performing graceful reinsertion of a switch into an MLAG domain in accordance with one or more embodiments of the invention.

After Step 406 and prior to step 500, the first MLAG peer (i.e., the MLAG peer that for which the software is being upgraded (or downgraded)) starts a reload delay timer. The duration of the reload delay timer is set such that there is sufficient time to enable a user (e.g., an administrator) to roll back the software upgrade (or downgrade) if MLAG peers (after one has been upgraded (or downgraded) with the new software) fail to reestablish the MLAG peering relationship.

While the peer link is active prior to step 500 (e.g., to enable the exchange of heartbeat messages), the MLAG peers have not been communicating over the peer link using the common MLAG protocol version identified in Step 406. Accordingly, in step 500, the MLAG peers attempt to reestablish communication using the common MLAG protocol version.

In Step 502, once the peer link is reestablished, the MLAG peering relationship between the MLAG peers is reformed. Reforming the MLAG peering relationship may include, but is not limited to, providing the first MLAG peer (i.e., the MLAG peer being upgraded or downgraded) with MLAG configuration information, virtual local area network (VLAN) information, and designating one of the MLAG peers as the primary switch and the other MLAG peer as the secondary switch.

In Step 504, the L2 control plane state of the first and second MLAG peers are subsequently synchronized. This may include, but is not limited to, providing the first MLAG peer with STP state information, IGMP information, and forwarding table entries from the second MLAG peer. In Step 506, a determination is made about whether the reload delay timer has expired. If the reload delay timer has expired, the process proceeds to step 510; otherwise the process proceeds to Step 508. In Step 508, the processes on the first MLAG wait/sleep for a predetermined period of time and then the process proceeds back to Step 506.

In Step 510, once the reload delay timer expires, the ports on the first MLAG peer are removed from the error-disabled state and set to an active state. This happens regardless of whether the MLAG domain has been successfully reestablished. If the MLAG domain has not been reestablished, then after Step 510, the two MLAG peers operate as independent switches; however, if the MLAG peers successfully reform the MLAG domain, then the MLAG peers appear as a single switch from the perspective of the external devices that are dually connected.

FIGS. 6A-6G show an example in accordance with one or more embodiments of the invention. The example is not intended to limit the scope of the invention.

Figure 6A:
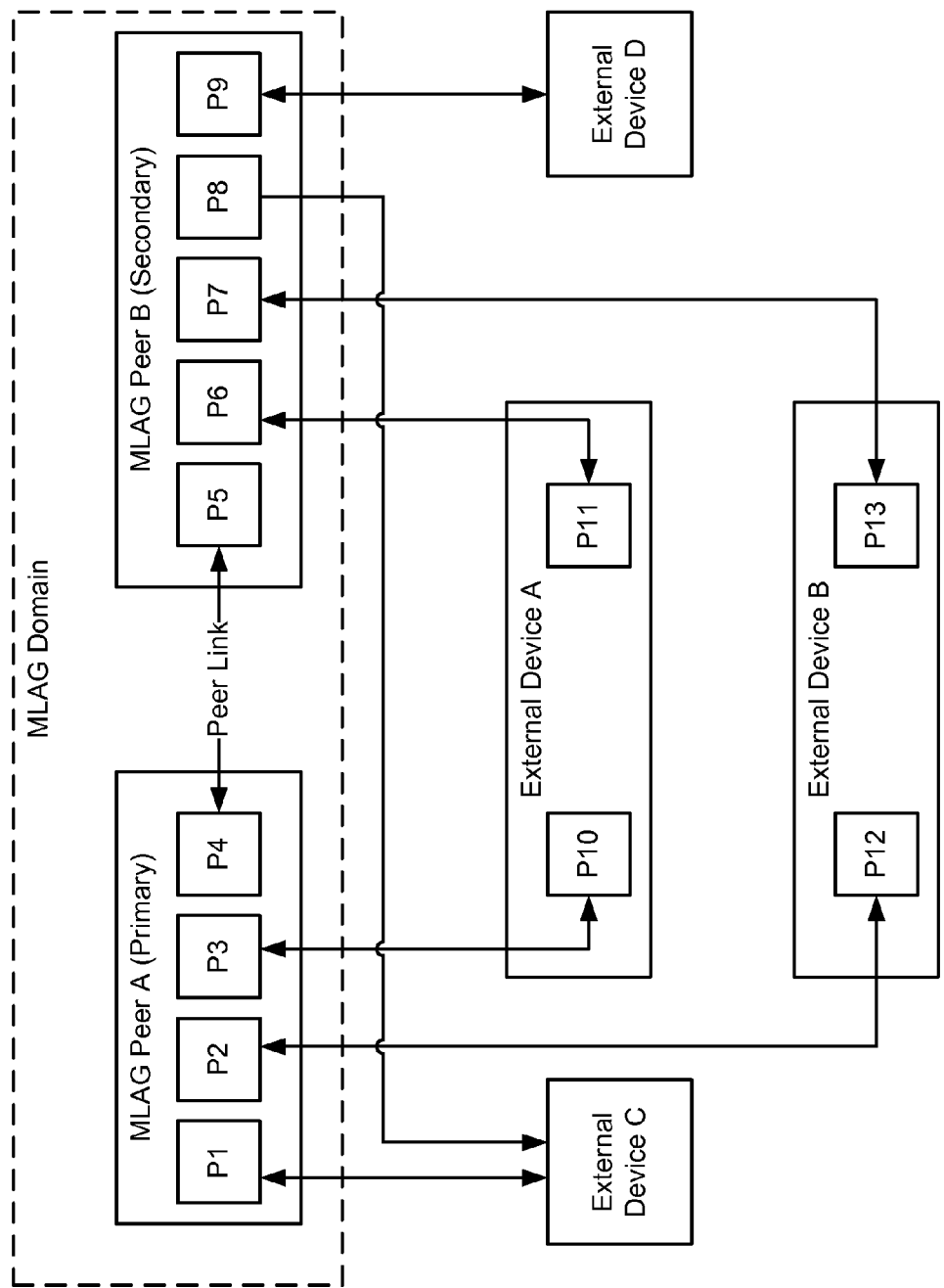
FIGS. 6A-6G show an example in accordance with one or more embodiments of the invention.

Referring to FIG. 6A, consider the scenario in an MLAG domain including MLAG Peer A and MLAG Peer B, where MLAG Peer A is initially designated as the primary switch and MLAG Peer B is initially designated as the secondary switch. Further, external devices A, B, and C are dually-connected devices while external device D is a singly-connected device (i.e., external device D is only connected to MLAG Peer B).

Figure 6B:
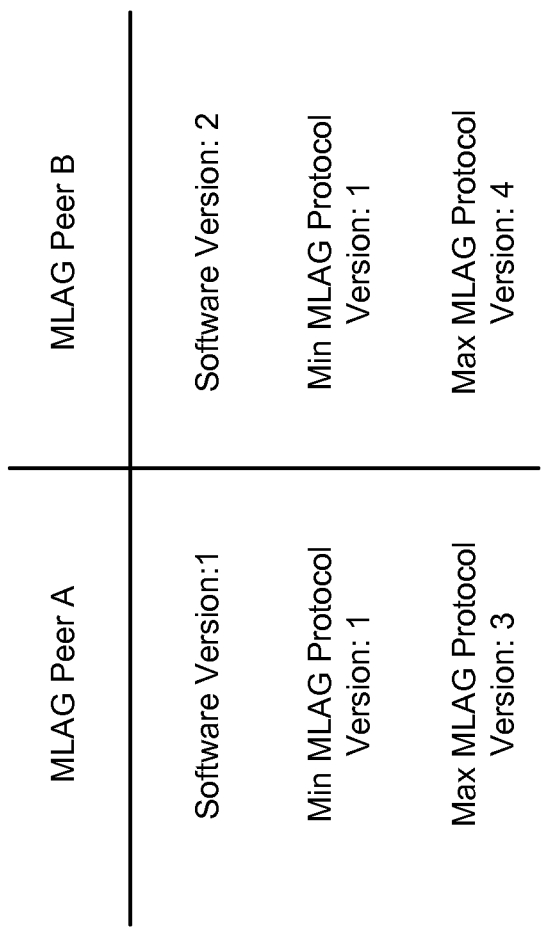

Referring to FIG. 6B, MLAG Peer A is initially executing software version 1, which supports MLAG protocol versions 1-3 (as denoted by the Min MLAG Protocol Version: 1 and the Max MLAG Protocol Version: 3). Further, MLAG Peer B is initially executing software version 2, which supports MLAG protocol versions 1-4 (as denoted by the Min MLAG Protocol Version: 1 and the Max MLAG Protocol Version: 4).

Figure 6C:
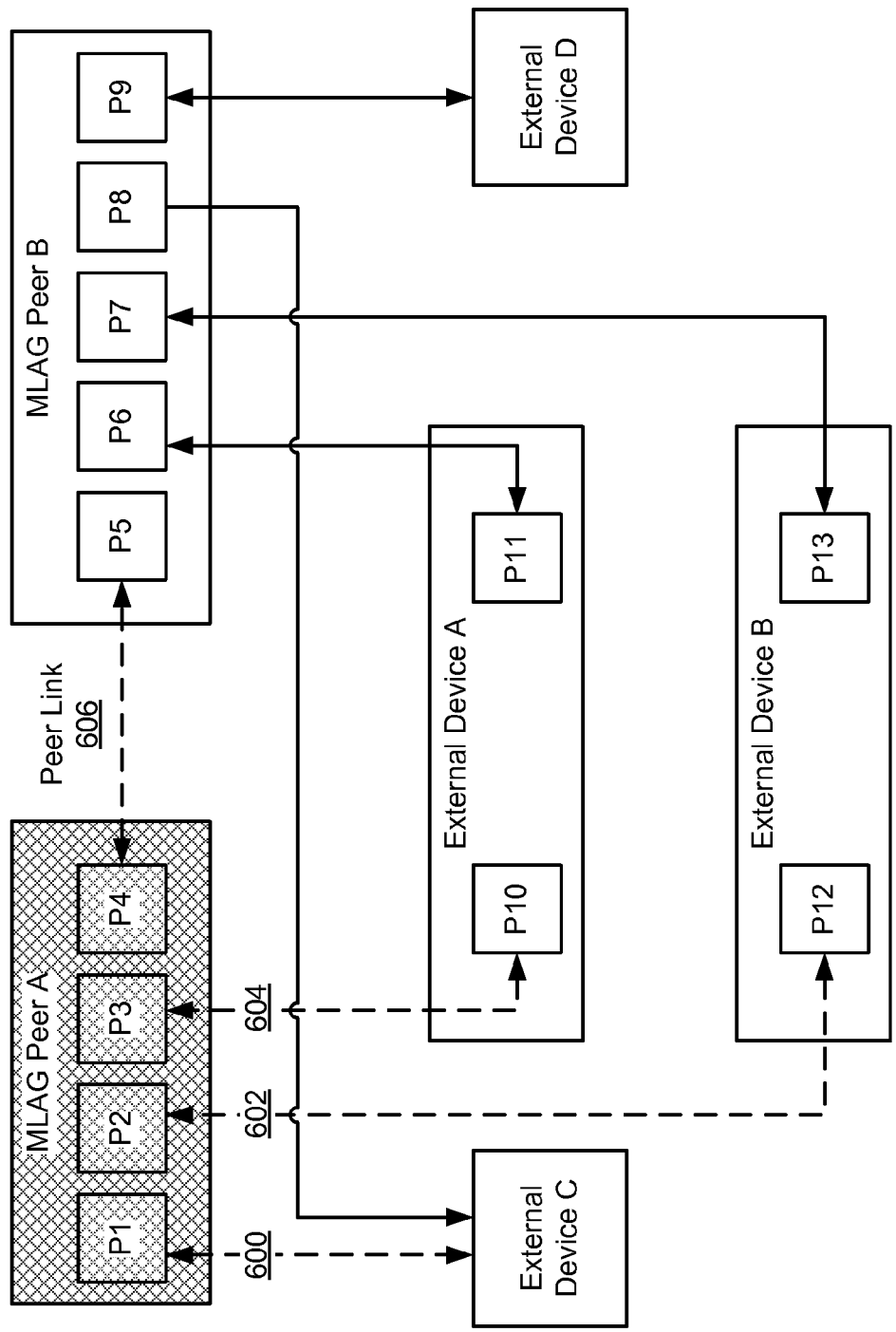

Referring to FIG. 6C, assume that a new version of software is loaded on to MLAG Peer A and, after loading the new software, MLAG Peer A receives a request to reboot MLAG Peer A using the new version of software. Assume for the purposes of this example, that the MLAG Peer A and/or the MLAG domain satisfies checks specified in Step 206 (see FIG. 2) and that MLAG Peer A is subsequently powered down and rebooted. As a result of the powering down and rebooting, links (600, 602, 604, 606) between MLAG Peer A and (i) external devices A, B, and C and (ii) MLAG Peer B become inactive. At this stage, MLAG Peer B performs MLAG SSO, as described in FIG. 3. Further, as previously discussed, there is no MLAG domain at this time.

Figure 6D:
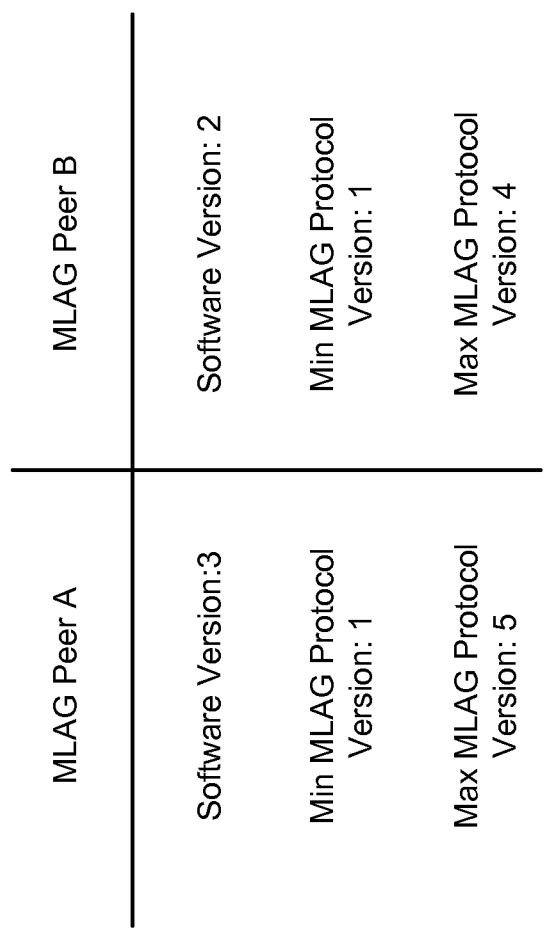

Referring to FIG. 6D, after rebooting MLAG Peer A, MLAG Peer A is executing software version 3, which supports MLAG protocol versions 1-5 (as denoted by the Min MLAG Protocol Version: 1 and the Max MLAG Protocol Version: 5).

Figure 6E:
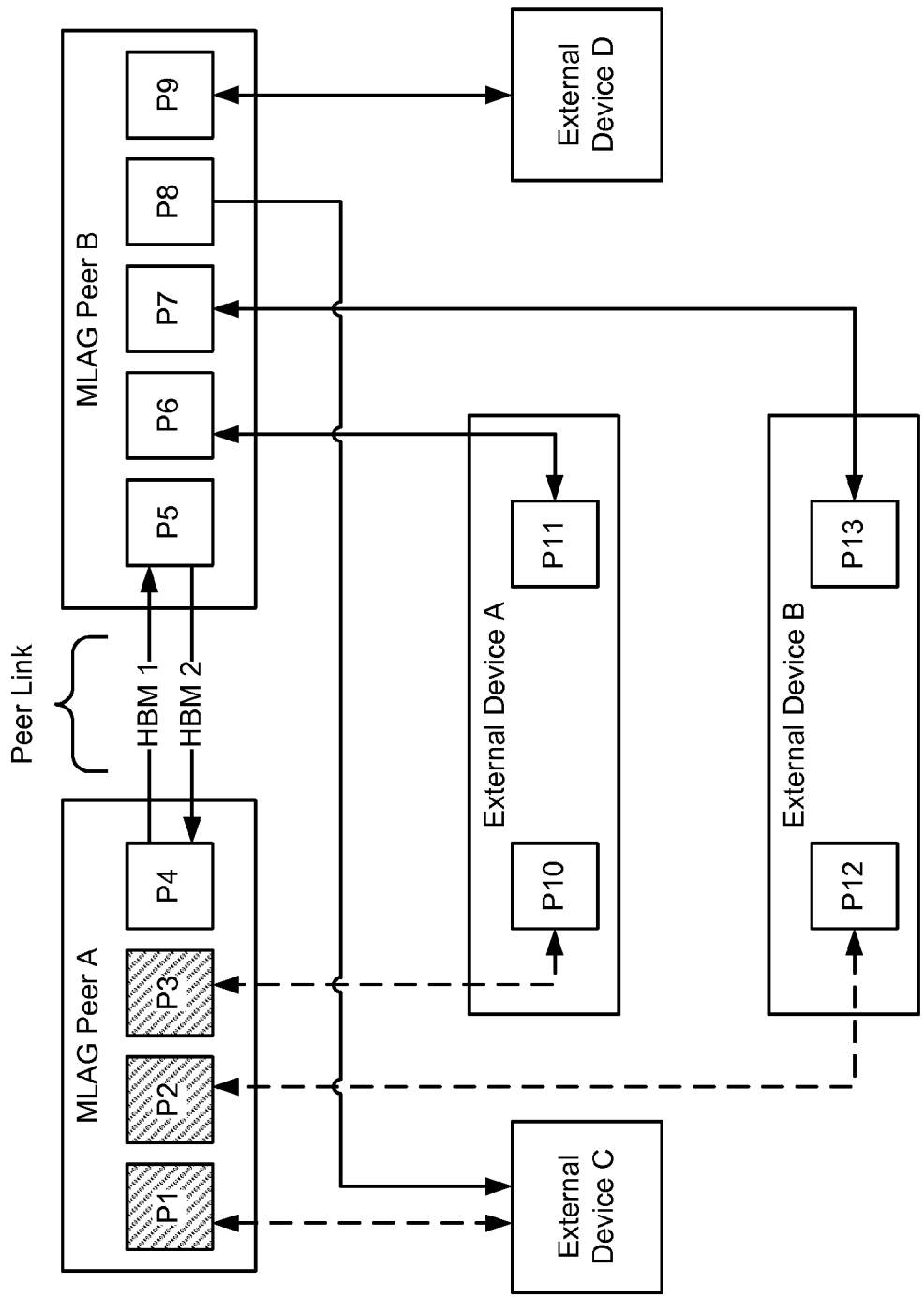

Referring to FIG. 6E, once rebooted but prior to the expiration of the reload delay timer (which may be started once MLAG Peer A is rebooted), the non-peer ports (i.e., P1-P3) are set in an error-disable state. However, the peer port (i.e., P4) may be used to send heartbeat messages (e.g., HMB 1) to MLAG Peer B and receive heartbeat message (e.g., HMB 2) from MLAG Peer A in order to perform the steps for cross-version interworking as described in FIG. 4. Once the cross-version interworking has been successfully performed, the common MLAG protocol version is selected as MLAG protocol version 4 (see FIG. 6D).

Figure 6F:
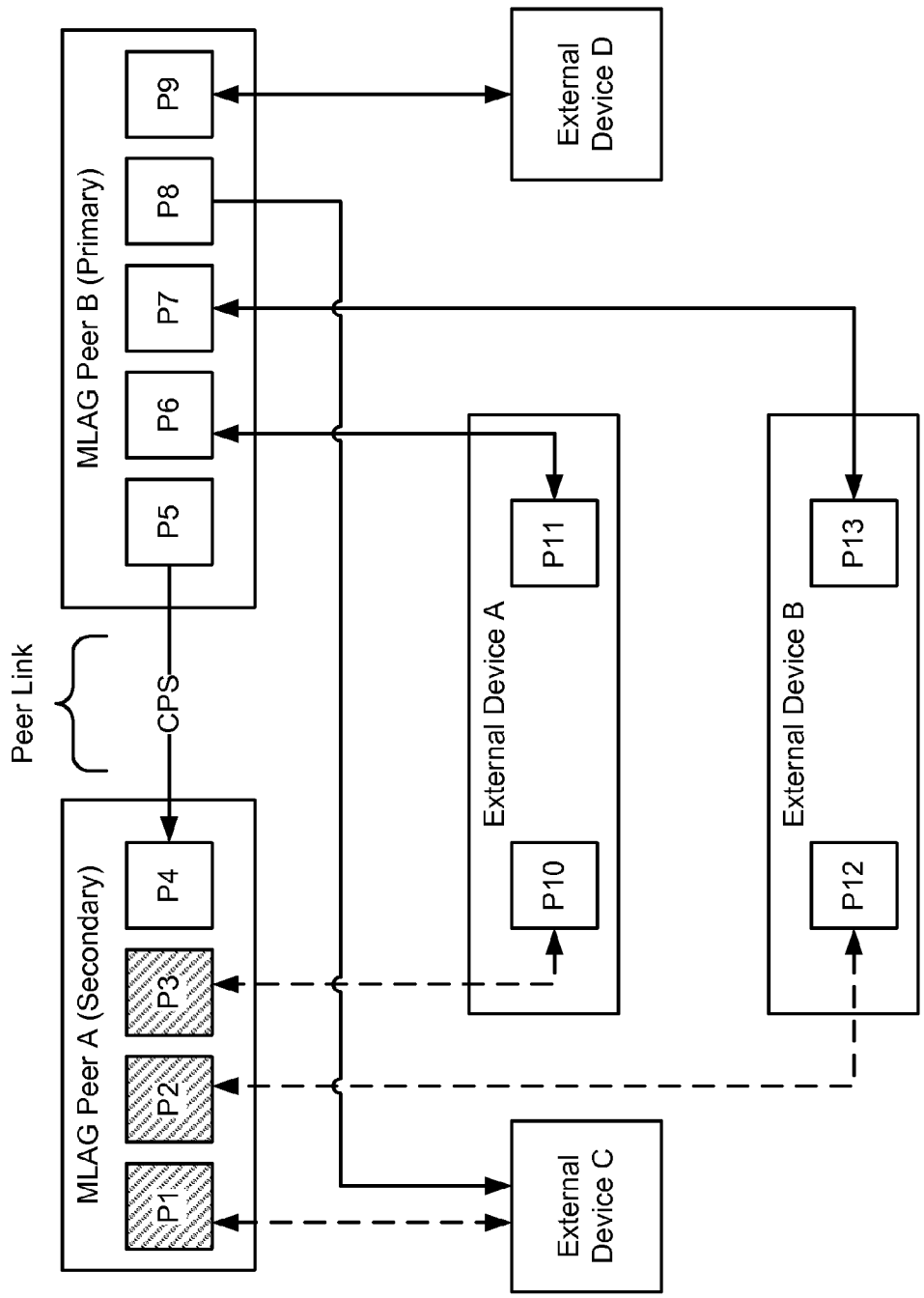

Referring to FIG. 6F, once the common MLAG protocol version has been selected, the peer link is reestablished and communication over the peer link is performed in accordance with the common MLAG protocol version. As described in FIG. 5, the MLAG peering relationship is subsequently reestablished and, as part of this process, the MLAG peers select a primary switch and a secondary switch. In this example, MLAG Peer B is selected as the primary switch while MLAG Peer A is selected as the secondary switch. Once the peering relationship has been reestablished, MLAG Peer B provides the control plane state (CPS) information to MLAG Peer A in order to synchronize the control plane states in the MLAG peers. At this stage, the MLAG domain has been reformed but the reload delay timer has not expired and, as such, the non-peer ports on MLAG Peer A are still in an error-disable state.

Figure 6G:
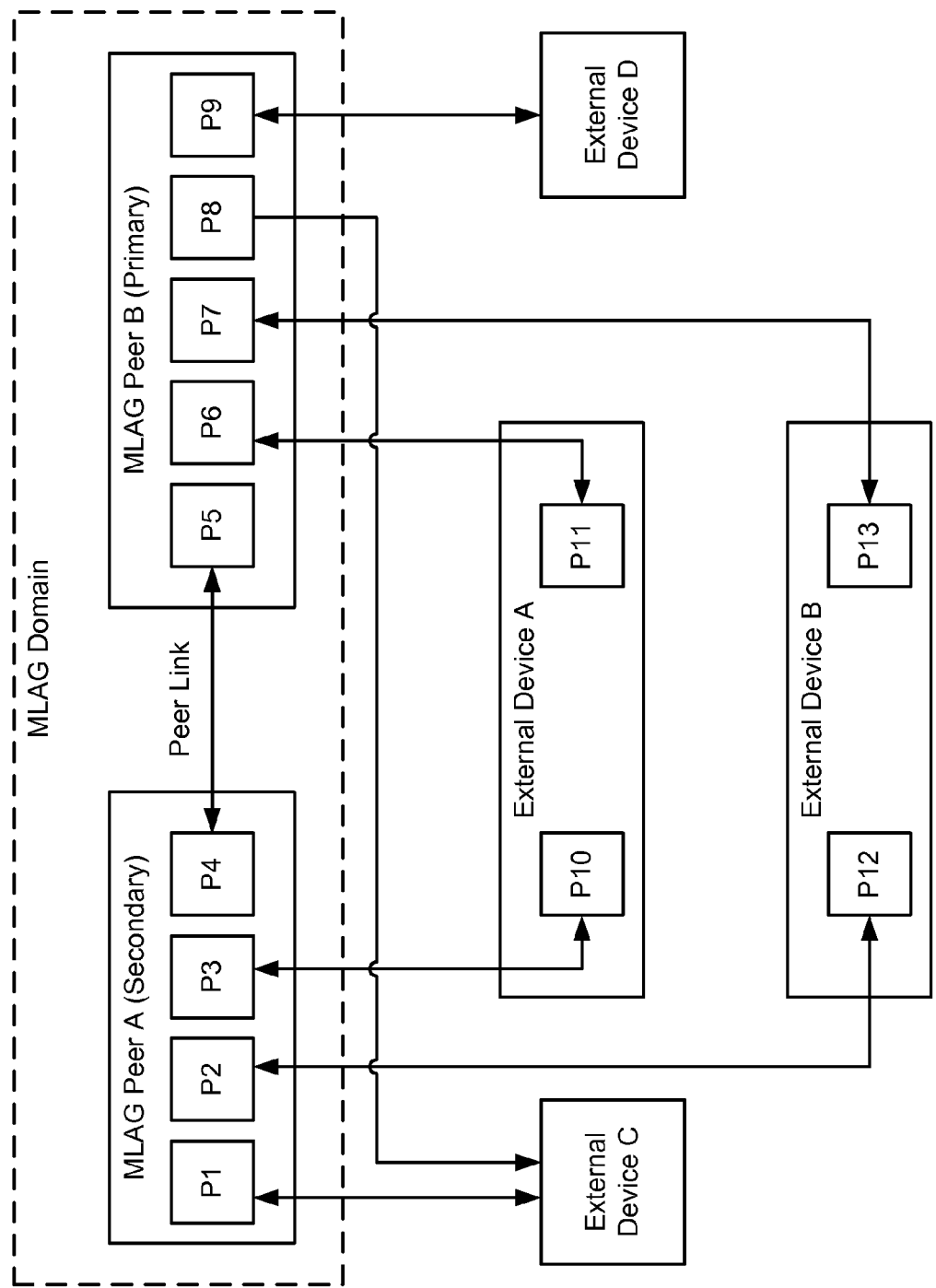

Referring to FIG. 6G, once the reload delay timer has expired, the non-peer ports on MLAG Peer A are set to an active state and the MLAG domain resumes normal operation using the non-peer ports on MLAG Peer A.

Embodiments of the invention enable a switch in an MLAG domain to be updated while allowing the second switch in the MLAG domain to continue to service all packets from dually-connected external nodes. In this manner, packets from the dually-connected external nodes continue to be forwarded (or otherwise processed) by the second switch. Further, embodiments of the invention enable the MLAG domain to be reformed with the upgraded switch (or downgraded) and the second switch without dropping packets (or with only dropping a minimal number of packets).

One or more embodiments of the invention may be implemented using instructions executed by one or more processors in the system. Further, such instructions may correspond to computer readable instructions that are stored on one or more non-transitory computer readable mediums.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A non-transitory computer readable medium comprising instructions, which when executed by at least one processor perform a method for performing an in-service software update (ISSU) in a multichassis link aggregation (MLAG) domain, the method comprising:
 restarting a first switch using a second version of software, wherein the first switch is currently executing a first version of the software and the first version of the software is different from the second version of the software;
 detecting by a second switch that the first switch is restarting and, in response to the detection, performing a stateful switch-over (SSO), wherein the MLAG domain consists of the first switch and the second switch;
 after restarting the first switch:
  prior to the first switch performing graceful reinsertion into the MLAG domain, setting all non-peer ports on the first switch to an error-disabled state and selecting a common MLAG protocol version supported by the first switch and the second switch; and
  performing graceful reinsertion comprising:
   reestablishing a peering relationship between the first switch and the second switch using the common MLAG protocol; and
   after reestablishing the peering relationship between the first switch and the second switch, synchronizing a control plane state of the first switch with a control plane state of the second switch and setting all non-peer ports on the first switch to an active state.

2. The non-transitory computer readable medium of claim 1, wherein prior to restarting the first switch:
 receiving a request to restart the first switch; and
 in response to the request, making a determination that the first switch may be restarted.

3. The non-transitory computer readable medium of claim 2, wherein making the determination that the first switch may be restarted comprises at least one selected from a group consisting of determining that the second version of software supports at least one version of the MLAG protocol in common with the second switch, determining that every external node intended to be connected to both the first switch and the second switch is actively connected to the second switch, and determining that a spanning tree protocol implemented by the MLAG domain is in a stable state.

4. The non-transitory computer readable medium of claim 1, wherein performing SSO by the second switch comprises the second switch performing processing for all layer-2 control protocols, wherein prior to SSO the second switch was not processing at least spanning tree protocol (STP) for the MLAG domain and wherein the first switch was processing STP for the MLAG domain.

5. The non-transitory computer readable medium of claim 1, wherein selecting the common MLAG protocol version comprises:
receiving, by the first switch, a first heartbeat message from the second switch, wherein the first heartbeat message comprises a first range of MLAG protocol versions supported by the second switch;
receiving, by the second switch, a second heartbeat message from the first switch, wherein the second heartbeat message comprises a second range of MLAG protocol versions supported by the first switch; and
selecting, using the first range of MLAG protocols and the second range of MLAG protocols the common MLAG protocol version.

6. The non-transitory computer readable medium of claim 5, wherein the first heartbeat message further comprises clock data.

7. The non-transitory computer readable medium of claim 5, wherein the common MLAG protocol version is a highest common MLAG protocol version supported by the first switch and the second switch.

8. The non-transitory computer readable medium of claim 5, wherein the first heartbeat message and the second heartbeat message are sent over a peer link between the first switch and the second switch.

9. The non-transitory computer readable medium of claim 8, wherein the peer link comprises a plurality of physical links between the first switch and the second switch.

10. The non-transitory computer readable medium of claim 1, wherein reestablishing the peering relationship comprises providing, by the second switch, at least one selected from a group consisting of:
MLAG configuration information to the first switch, and
virtual local area network (VLAN) information to the first switch.

11. The non-transitory computer readable medium of claim 1, wherein reestablishing the peering relationship comprises designating one selected from a group consisting of the first switch and the second switch as a primary switch in the MLAG domain, wherein the primary switch is responsible for performing spanning tree protocol (STP) processing for the MLAG domain and providing spanning tree state to a non-primary switch in the MLAG domain.

12. The non-transitory computer readable medium of claim 11, wherein the non-primary switch performs STP using the spanning tree state provided by the primary switch to obtain STP results, wherein the STP results are not used by the MLAG domain until the primary switch fails.

13. The non-transitory computer readable medium of claim 1, wherein synchronizing the control plane state of the first switch comprises receiving layer-2 forwarding table entries from the second switch.

14. The non-transitory computer readable medium of claim 13, wherein synchronizing the control plane state of the first switch further comprises receiving, from the second switch, at least one selected from a group consisting of spanning tree state and Internet Group Management Protocol (IGMP) information.

15. The non-transitory computer readable medium of claim 1, wherein setting all non-peer ports on the first switch to the active state occurs after expiration of a delay timer.

16. The non-transitory computer readable medium of claim 1, wherein the second version of software is an older version of software as compared to the first version of the software.

* * * * *